April 8, 1958         J. G. SPEER         2,830,240
ELECTROMAGNETICALLY CONTROLLED CAPACITORS OR THE LIKE
Filed Sept. 23, 1954         2 Sheets-Sheet 1
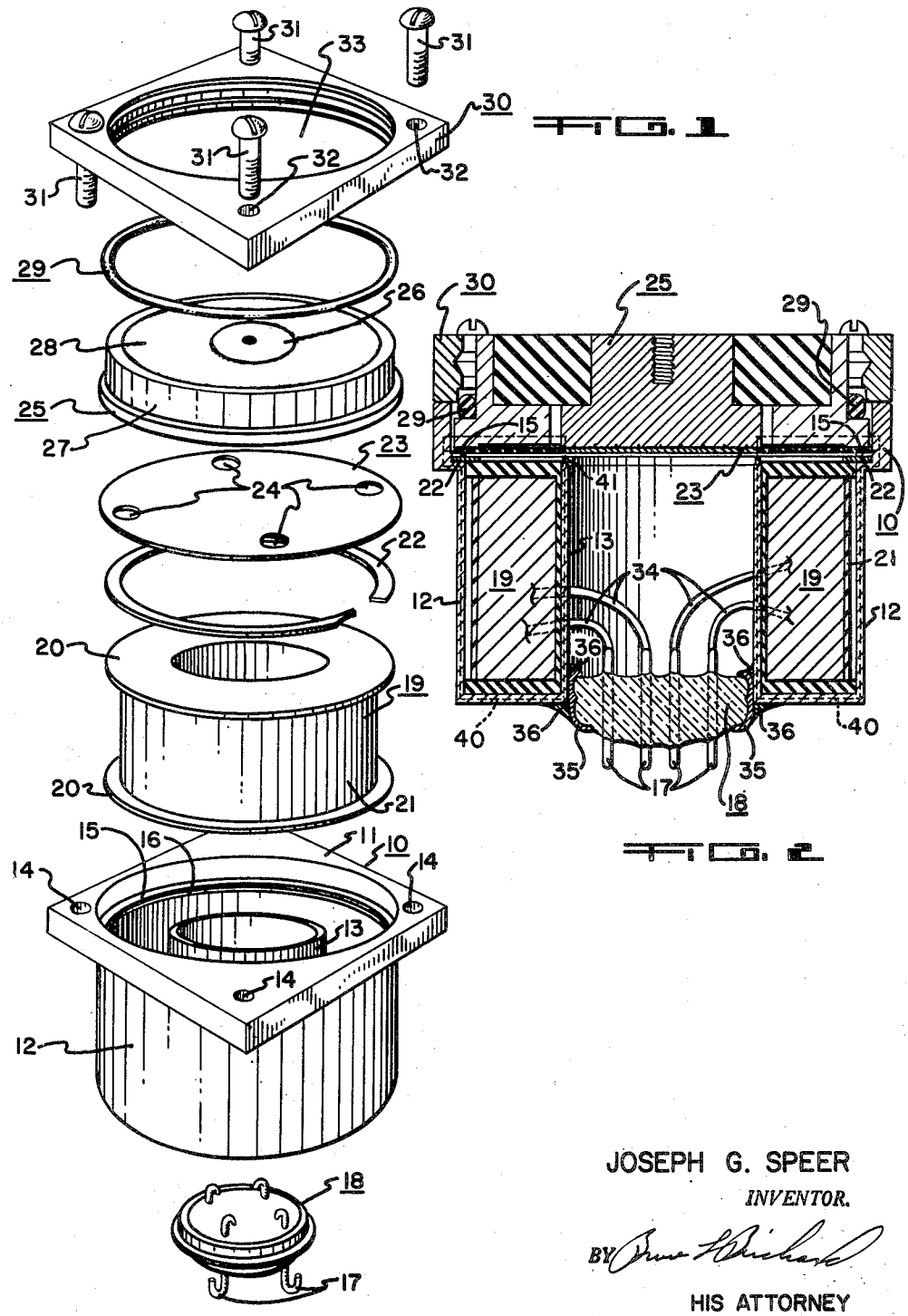
JOSEPH G. SPEER
*INVENTOR.*
BY
HIS ATTORNEY April 8, 1958          J. G. SPEER          2,830,240

ELECTROMAGNETICALLY CONTROLLED CAPACITORS OR THE LIKE

Filed Sept. 23, 1954          2 Sheets-Sheet 2

JOSEPH G. SPEER
*INVENTOR.*
BY
HIS ATTORNEY

United States Patent Office 2,830,240
Patented Apr. 8, 1958

2,830,240

ELECTROMAGNETICALLY CONTROLLED CAPACITORS OR THE LIKE

Joseph G. Speer, Santa Monica, Calif., assignor to Hoffman Electronics Corporation, a corporation of California Application September 23, 1954, Serial No. 457,868

5 Claims. (Cl. 317—150)

This invention is related to variable capacitors and, more particularly, to an improved variable capacitor which may be controlled electromagnetically.

In the past, many attempts have been made to design variable reactances for employment in the tuning circuitry of panoramic receivers. These receivers have the characteristic of periodically sweeping over a pre-selected one of a plurality of frequency bands extending in their totality over a wide range of frequencies, as, for example, 100 kc. to 100 mc. To accomplish this selective sweeping over the entire frequency range of the receiver, each of the tuned circuits of the pre-selector and oscillator stages must incorporate a plurality of band-switching reactances (capacitive or inductive) and at least one continuously variable sweep reactance (inductive or capacitive). Heretofore, pre-selector and oscillator tuned circuits have utilized either a motor-driven variable capacitor and a plurality of band changing inductors, or one or more current-controlled permeability-tuned inductors and a plurality of band changing capacitors. Motor-driven capacitors are somewhat undesirable because of moving parts and resultant wear thereupon, and because of the relatively large power consumption by the motor. Disadvantages in the employment of current controlled inductors center in the fact that they exhibit low and irregular Q's and are useful for only limited frequency ranges.

Therefore, it is an object of this invention to provide a new and useful electromagnetically controlled tuning element.

It is a further object of this invention to provide a novel electromagnetically controlled capacitor.

It is still further object of this invention to provide a new and useful electromagnetically controlled capacitor which will be characterized by optimum reliability, minimum power consumption, and will lend itself to employment in sweep circuits.

According to this invention, at least one coil is disposed within a coil housing element, and coil leads are connectable to terminal lugs mounted upon but insulated from the coil housing base. The housing itself has an internal circumferential lip portion upon which rests a diaphragm of magnetic material disposed in such a manner that it is adjacent the coil and in proximity to the core end of the housing. Disposed within the housing to rest upon the diaphragm is a round element of magnetic material having an outer portion and an inner portion insulated therefrom. The diaphragm and the inner portion of the above-mentioned round magnetic element form two capacitor "plates." The mean distance therebetween being regulatable by the instantaneous current passing through the coil. This invention, in addition, includes air viscosity and thermal expansion corrective features which shall be hereinafter explained.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

Figure 1 is an exploded view of an electromagnetically controlled capacitor according to the present invention.

Figure 2 is a sectional view of an assembled electromagnetically controlled capacitor.

Figure 3:
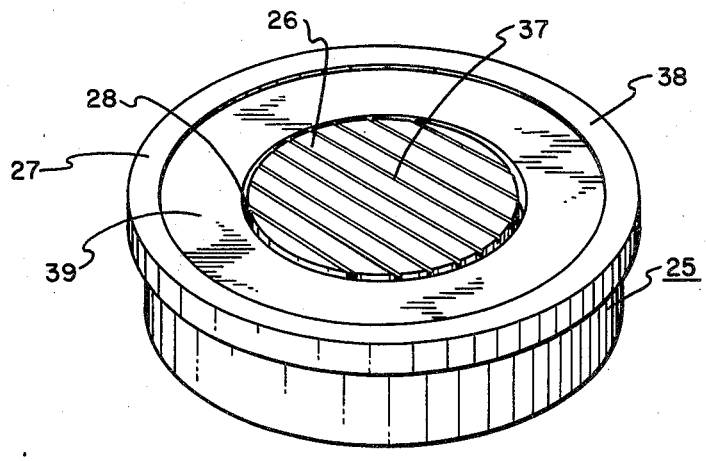
Figure 3 is a bottom perspective view of a component part of an electromagnetically controlled capacitor according to the present invention.

In Figure 1, coil housing 10 has an upper rectangular flat portion 11, an outer cylindrical housing portion 12, and an inner cylindrical core portion 13, all of which are made integrally with each other. Upper portion 11 is shown to have four tapped mounting holes 14. Housing portion 12 has an inner lip 15 and a retainer ring recess 16. Core portion 13 has four holes disposed near the core base for admittance of coil terminals so that these terminals may be soldered or otherwise affixed to input terminals 17 of metal-ringed porcelain plug 18. Coil 19 has insulating end portions 20 and circumferential insulating portion 21 wrapped around two coil windings. Coil 19 is positioned within housing 10 around core 13, and is secured in position by means of the insertion of retaining ring 22 in retaining ring recess 16. Metal diaphragm 23 has four air relief holes 24 and is inserted within housing 10 to rest upon internal lip 15. Member 25 has pole piece 26, ring 27, and insulating portion 28. Pole piece 26 has a tapped center hole to accommodate a threaded output terminal. Member 25 is inserted within housing 10 to rest upon diaphragm 23. O-ring 29 is next inserted within housing 10 to seal the unit from the outside atmosphere. The electromagnetically controlled capacitor is completed in its assembly by the placing of top element 30 over top portion 11 of housing 10, and by securing the same with four screws 31. As is shown, top element 30 has four holes 32 and an internal circular cut-out 33.

To facilitate discussion, Figures 2 and 3 shall be considered in conjunction with Figure 1. In Figure 2 is shown a sectional view of an assembled electromagnetically controlled capacitor according to the present invention. Coil 19 fits snugly between the walls of housing 12 and core 13. Coil 19 is retained in position by retainer snap ring 22. Member 25 rests upon diaphragm 23, which in turn rests upon interior lip 15 of coil housing 10. O-ring 29 is shown adjacent to the junction of coil housing 10 and top element 30. Wire leads 34 from coil 19 pass through access holes in core 13 to connect with input terminals 17 of porcelain plug 18. Outer metallic ring 35 of porcelain plug 18 is secured to coil housing 10 by solder connections 36.

Figure 3 displays the bottom side of member 25. Insulating material 28 separates pole piece 26, having serrations 37, from ring 27. The surface of outer ring portion 38 of ring 27 lies in the same plane as the surface of pole piece 26. Inner ring recessed area 39, together with serrations 37, provide an air escape region when the capacitance, formed by pole piece 26 and diaphragm 23, is at its maximum value.

The electromagnetically controlled condenser assembly, shown and described in Figures 1, 2 and 3 operates as follows. For simplicity, let it be supposed for the moment that coil 19 has a single, constant-current carrying winding producing a magnetomotive force of $4\pi NI$ gilberts, where N is the number of turns of the winding and I is its current in amperes. Dotted lines 40 show the magnetic circuit of the subject condenser. It is well established that in magnetic circuits containing an air gap, a definite force is exerted on adjacent magnetic material which, by considering the energy changes associated with a differential displacement of the magnetic material and making certain assumptions, is proportional to $B^2A$, where B is the flux density in lines per square centimeter and A is the cross-sectional area in square centimeters. For a given magnetomotive force ($4\pi NI$) the total flux $\phi$ will remain relatively constant despite variation in the core ring cross-sectional area adjacent diaphragm 23 since the change in the reluctance (R) of the air gap between core 13 and diaphragm 23 produced by such variation will not seriously affect the total reluctance of the magnetic circuit, owing in large measure to the high reluctance (R') of the air gap between pole piece 26 and ring 27. Hence, for a constant $\phi$ the cross-sectional area of ring portion 41 of core 13 should be made as small as possible, since flux density (B) is inversely proportional to the cross-sectional area (A) and since the force upon the diaphragm is proportional to $B^2A$. However, the limit to which the ring cross-sectional area of core portion 41 (see Figure 2) may be reduced, theoretically, will be to the point where the ring wall thickness is equal to the thickness of diaphragm 23, approximately, since if the wall is reduced to an even less thickness the core ring will saturate before the diaphragm itself saturates. Actual practice has shown that the core thickness should be about three times the diaphragm thickness.

It is to be noted that pole piece 26 of member 25 is also included in the magnetic circuit of the capacitor. Were it not so included, then the amount of force exerted upon diaphragm 23 by core 13 would be determined by the flux level which would cause diaphragm 23 to saturate. For optimum frequency response, the diaphragm 23 should be as thin as is practicable, which requirement seemingly places a limit upon the amount of force which may be exerted upon diaphragm 23. However, this limitation is removed by the inclusion of pole piece 26 in the magnetic circuit of diaphragm 23 and core 13. The flux between pole piece 26 and core 13 will add to the normal component of the flux between diaphragm 23 and core 13 as contributed by the magnetic circuit branch not including pole piece 26 so as to increase materially the flux density between diaphragm 23 and pole piece 26 and hence increase the force applied by core 13 to diaphragm 23.

It might be thought that by virtue of the flux between diaphragm 23 and pole piece 26 there would be a force of attraction therebetween which would counteract in some degree the attractive force of core 13 upon diaphragm 23. In a small measure, this is true. But this effect will be negligible owing to the divergence of the lines of flux between diaphragm 23 and pole piece 26, because of the large area of pole piece 26. The degree of divergence and lessening of the flux field density between diaphragm 23 and pole piece 26 may be enhanced by making the diameter of the pole piece slightly larger than the outer diameter of ring portion 41. Thus, by virtue of the present design, the force which may be applied to diaphragm 23 is limited only by the selectable thickness of ring portion 41. If desired, the core might of course be completely solid.

It is, of course, highly desirable that coil 19, when driven by a linear saw-tooth waveform, will control the mean distance between pole piece 26 and diaphragm 23 in such a fashion that the frequency of the parallel resonant circuit which includes this capacitance will be a linear function of the saw-tooth current. Remarkably enough, the present invention satisfied this desired linear relationship between sawtooth current and frequency, both theoretically and in practice. From Hooke's law (1) $$d=kF$$

where $d$ is mean displacement, F is force, and $k$ is a constant. This law, of course, is applied to diaphragm 23. But the capacitance C between pole piece 26 and diaphragm 23 is defined by (2) $$C=\frac{k'}{d}$$

where $k'$ is a second constant.

The frequency of the parallel resonant circuit including the capacitance defined by pole piece 26 and diaphragm 23 will be (3) $$f=\frac{1}{2\pi\sqrt{LC}}$$

where $f$ is the resonant frequency and L is the inductance of the parallel resonant circuit. Hence, (4) $$f=\frac{k''}{\sqrt{C}}$$

where $k''$ is a third constant. From Equations 2 and 4 we have (5) $$f=k'''\sqrt{d}$$

where $k'''$ is a fourth constant. But (6) $$F=KB^2A \text{ (supra)}$$

where K is a fifth constant. And B is proportional to the current I at any instantaneous time. Hence, I is proportional to the square root of force F. Therefore, from Equation 1

(7) $$I=K'\sqrt{d}$$

where K' is a sixth constant. Finally, from Equations 5 and 7

(8) $$f=K''I$$

where K'' is a seventh constant. Experiment has verified the above analysis, notwithstanding the fact that the diaphragm will assume a slightly parabolic configuration having a varying latus rectum.

In Figure 2, it is seen that diaphragm 23 does not extend over the entire area of lip 15, of housing 10. The exposed lip area is provided to allow for any thermal expansion of diaphragm 23. In the absence of such a relief area, buckling of diaphragm 23 and undesired sporadic responses will occur.

In Figure 3 it is shown that member 25 has a recessed area 39, and also that pole piece 26 is provided with a plurality of serrations 37. In the absence of serrations 37 and recessed area 39, the viscosity of the air entrapped between diaphragm 23 and pole-piece 26 will not allow the air to escape rapidly enough as the distance between diaphragm 23 and pole piece 26 is diminished. Hence, there will result a "cushioning" effect, which is very undesirable in that it tends to reduce capacitance increments with relation to current increments. To obviate this cushioning effect, serrations 37 are provided and as a result air escapes into recessed area 39 as diaphragm 23 approaches pole piece 26.

Figure 4:
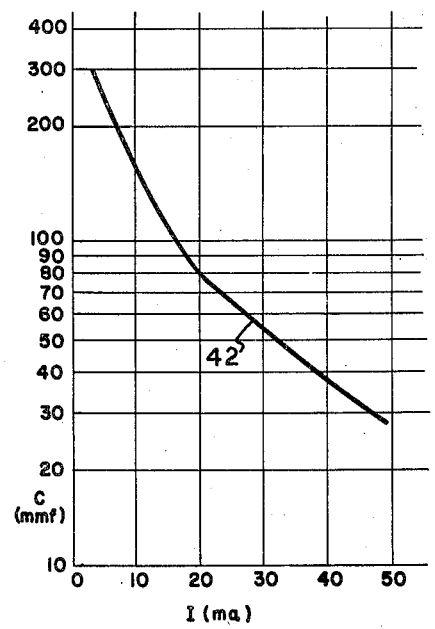
Figure 4 is a graph showing a typical response curve of an electromagnetically controlled capacitor according to this invention.

Since coil current I is inversely proportional to the square root of 1/C, where C is the capacitance existing between pole piece 26 and diaphragm 23, a plot of C in mmf. versus coil current in ma. on semi-logarithmic graph paper should produce a straight line. Actual experiment demonstrates that this relationship does not hold absolutely true in the very low current region (see Figure 4). The slight deviation shown will not be too objectionable, in the case of application to panoramic receivers. If desired, the condenser need not be operated on upper portion of the curve.

It has been mentioned that, preferably, two windings should be employed to constitute coil 19, instead of merely one winding. The purpose of employing two windings is to utilize one winding as the sawtooth control winding and the other as a bias winding. The ratio in turns of the two windings should be about 2 to 1, in favor of the sawtooth winding. Curve 42 in Figure 4 will experience a horizontal translation in the event the current through the bias winding is varied, and will also experience a rotational movement and consequential change of slope in the event the A. C. component of the sawtooth input current signal is reduced. Accordingly, variable resistors shunting the control winding and the bias winding will perform suitably as alignment adjustments to align the high and low ends of each frequency band, and also to "track" the preselector and oscillator tuned circuits utilizing the magnetically controlled condensers in, for example, a panoramic receiver.

In the event the capacitor chamber is evacuated, the response of the capacitor to increased frequency of the sawtooth input signal will be greater, and also the need for serrations in pole piece 26, an air recess area in ring 27, and diaphragm air holes will be obviated.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. An electromagnetically controlled capacitor including, in combination, a coil housing having an outer cylindrical member with upper and lower member portions, an upper mounting member made integrally with said outer cylindrical member, an inner cylindrical core member, a base ring member made integrally with said inner and outer cylindrical members, said upper portion of said outer cylindrical member having a substantially larger inside diameter than said lower portion of said outer cylindrical member and also extending somewhat above said inner cylindrical core member, said lower outer cylindrical member portion having a circumferential inner recessed area disposed in proximity to the juncture of said upper and lower outer cylindrical member portions; an inductance member disposed within said coil housing between said inner and outer cylindrical members, said inductance member consisting of an insulating spool member, at least one inductance winding wound thereupon, and a plurality of input leads; an insulating base plug having a plurality of electrical terminals and disposed within and affixed to said base ring portion of said coil housing, said inner cylindrical core member having a plurality of access holes drilled in proximity to said base ring member, said wire leads of said inductance member being routed through said hole plurality of said core member and being connected to said terminal plurality of said insulating plug; retaining means disposed in said recessed area of said outer cylindrical member of said coil housing to fixedly secure said inductance member within said coil housing; a diaphragm of magnetically permeable material disposed to rest upon said juncture of said upper and lower portions of said coil housing outer cylindrical member; a top member disposed upon said diaphragm within said coil housing, said top member consisting of an inner pole piece of magnetically-permeable material, an outer ring member of magnetically-permeable material, and an insulation ring member separating said inner pole piece from said outer ring member, said coil housing, outer ring member, pole piece, and diaphragm being disposed in a magnetic circuit having reluctance gaps disposed between said outer ring member and said pole piece, said pole piece and said diaphragm, and said diaphragm and said core member, and said diaphragm being electrically insulated from said pole piece during the operation of said capacitor; means affixed to said pole piece for electrically coupling thereto; an O-ring disposed about the base of said top member; a top mounting member having a center aperture to accommodate the mounting of said top member, said top mounting member being disposed about said top member and over said O-ring seal to lie contiguously with said upper mounting member of said coil housing; and interconnecting means for securing said top mounting member to said coil housing upper mounting member.

2. Apparatus according to claim 1 in which said inductance member includes a control winding and an independent bias winding.

3. Apparatus according to claim 1 in which said inner pole piece has at least one serration therein at a surface adjacent said diaphragm for the escape of air thereover, said outer ring member has a recessed air relief area adjacent said inner pole piece, and said diaphragm has at least one air relief hole.

4. An electromagnetically controlled capacitor including, in combination, a coil housing having a core portion, a top member affixed to said coil housing, a paramagnetic diaphragm disposed between said core portion and said top member, said top member consisting of a magnetically-permeable inner pole piece, a magnetically-permeable outer ring member, and an insulation ring member separating said inner pole piece from said outer ring member, said diaphragm being electrically insulated from said pole piece during the operation of said capacitor, said pole piece having a bottom surface that lies in close proximity to said diaphragm and a side surface, said outer ring member having a bottom surface that lies in close proximity to said diaphragm and in substantially the same plane as said bottom surface of said pole piece, said outer ring member having a side surface that lies in close proximity to said side surface of said pole piece, and said coil housing and core portion, outer ring member, pole piece, and diaphragm being disposed in a magnetic circuit having reluctance gaps disposed between said outer ring member and said pole piece, said pole piece and said diaphragm, and said diaphragm and said core portion; and electrically energizable coil means disposed within said coil housing about said core portion.

5. An electromagnetically controlled capacitor including, in combination, a coil housing having a core portion, a top member affixed to said coil housing, a paramagnetic diaphragm disposed between said core portion and said top member, said top member consisting of a magnetically-permeable inner pole piece, a magnetically-permeable outer ring member, and an insulation ring member separating said inner pole piece from said outer ring member, said diaphragm being electrically insulated from said pole piece during the operation of said capacitor, said outer ring member having a recessed air relief area adjacent said inner pole piece, said diaphragm having at least one air relief hole, said pole piece having at least one serration therein at a surface adjacent said diaphragm for the escape of air thereover; said coil housing and core portion, outer ring member, pole piece, and diaphragm being disposed in a magnetic circuit having reluctance gaps disposed between said outer ring member and said pole piece, said pole piece and said diaphragm, and said diaphragm and said core portion; and electrically energizable coil means disposed within said coil housing about said core portion.

References Cited in the file of this patent

UNITED STATES PATENTS

| 2,249,158 | Morrison | July 15, 1941 |
| 2,372,231 | Terman | Mar. 27, 1945 |
| 2,416,557 | Wiener | Feb. 25, 1947 |
| 2,592,313 | Morgan | Apr. 8, 1952 |
| 2,610,259 | Roberton | Sept. 9, 1952 |
| 2,632,791 | Side | Mar. 24, 1953 |

FOREIGN PATENTS

| 898,903 | France | July 17, 1944 |